United States Patent
Lamba et al.

(10) Patent No.: US 11,558,459 B2
(45) Date of Patent: Jan. 17, 2023

(54) USER-DEFINED CUSTOM STORAGE CLASSES FOR HYBRID-CLOUD AND MULTICLOUD DATA MANAGEMENT

(71) Applicant: INTERNATIONAL BUSINESS MACHINES CORPORATION, Armonk, NY (US)

(72) Inventors: Amit Lamba, Buffalo Grove, IL (US); Gregory R. Dhuse, Chicago, IL (US); Akila Srinivasan, Carpentersville, IL (US); Ying Zhao Guo, Palatine, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 147 days.

(21) Appl. No.: 16/832,701

(22) Filed: Mar. 27, 2020

(65) Prior Publication Data
US 2021/0306419 A1      Sep. 30, 2021

(51) Int. Cl.
*H04L 12/24*      (2006.01)
*H04L 41/0803*   (2022.01)
*H04L 67/1097*   (2022.01)
*G06F 16/22*     (2019.01)

(52) U.S. Cl.
CPC ...... *H04L 67/1097* (2013.01); *G06F 16/2291* (2019.01)

(58) Field of Classification Search
CPC ............. H04L 67/1097; G06F 16/2291; G06F 16/182; G06F 16/11
USPC ........................................................ 709/223
See application file for complete search history.

(56) References Cited

U.S. PATENT DOCUMENTS

| | | | |
|---|---|---|---|
| 8,473,466 B1 | 6/2013 | Milby | |
| 8,504,983 B1 | 8/2013 | Englehart et al. | |
| 10,534,566 B1 | 1/2020 | Bk et al. | |
| 2012/0291099 A1* | 11/2012 | Grube | G06F 16/182 707/827 |
| 2013/0238575 A1* | 9/2013 | Amarendran | G06F 16/21 707/694 |
| 2016/0188253 A1* | 6/2016 | Resch | G06F 3/0647 711/172 |

(Continued)

FOREIGN PATENT DOCUMENTS

CN     108924186     11/2018

OTHER PUBLICATIONS

Mell et al., "The NIST Definition of Cloud Computing", NIST, Special Publication 800-145, Sep. 2011, 7 pages.

(Continued)

*Primary Examiner* — Ario Etienne
*Assistant Examiner* — Elizabeth Kassa
(74) *Attorney, Agent, or Firm* — Randy Emilio Tejeda; Andrew D. Wright; Calderon Safran & Cole P.C.

(57) ABSTRACT

A method includes: receiving, by a computing device, input defining a custom storage class in a first dispersed storage network; receiving, by the computing device, input defining a data management rule in the first dispersed storage network; determining, by the computing device, a data object in the first dispersed storage network satisfies the data management rule; and moving, by the computing device and in response to the determining, the data object to a second dispersed storage network according to the custom storage class.

20 Claims, 8 Drawing Sheets

(56) References Cited

U.S. PATENT DOCUMENTS

2017/0104755 A1* 4/2017 Arregoces .............. H04L 63/10
2018/0198852 A1* 7/2018 Agrawal .............. G06F 9/5072
2018/0373558 A1* 12/2018 Chang ................ H04L 63/0272

OTHER PUBLICATIONS

Leonard et al., "IBM Cloud Object Storage Concepts and Architecture System Edition", IBM Redbooks, 2019, 34 pages.

Anonymous, "IBM Cloud Object Storage: Storage classes and archive", https://www.ibm.com/cloud/object-storage/storage-class-tiers-archive, IBM, access Mar. 12, 2020, 13 pages.

Anonymous, "Use storage classes", https://cloud.ibm.com/docs/services/cloud-object-storage/basics?topic=cloud-object-storage-classes, IBM, accessed Mar. 12, 2020, 4 pages.

Anonymous, "Archive cold data with transition rules", https://cloud.ibm.com/docs/cloud-object-storage?topic=cloud-object-storage-archive#archive-add, IBM, accessed Mar. 12, 2020, 12 pages.

Anonymous, "FAQ", https://cloud.ibm.com/docs/cloud-object-storage?topic=cloud-object-storage-faq, accessed Mar. 12, 2020, 6 pages.

Anonymous, "Buckets, file paths, and partitions in Cloud Object Storage", https://dataplatform.cloud.ibm.com/docs/content/wsj/streaming-pipelines/Partition_Buckets.html, Feb. 4, 2020, 7 pages.

* cited by examiner

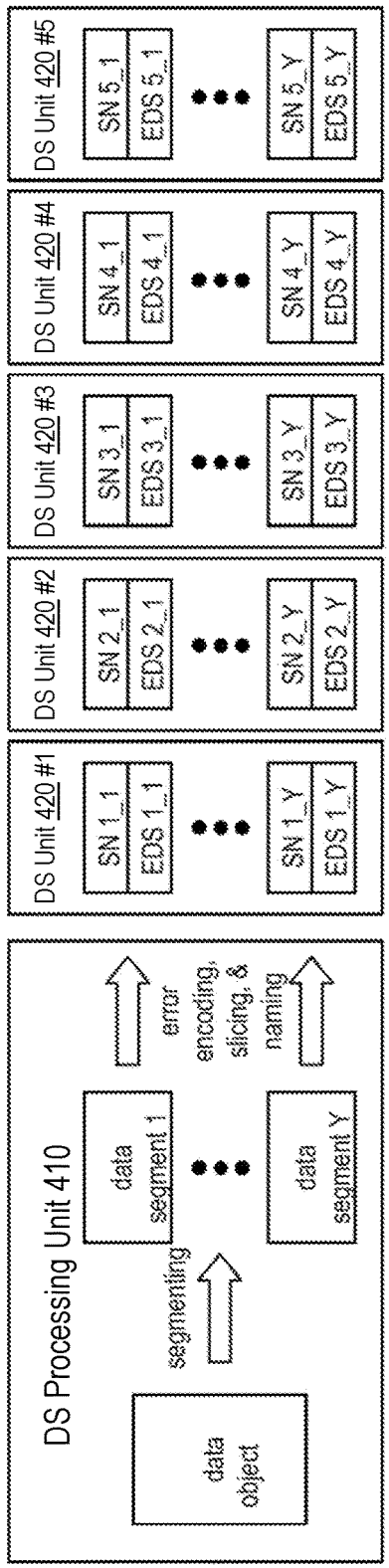
FIG. 5
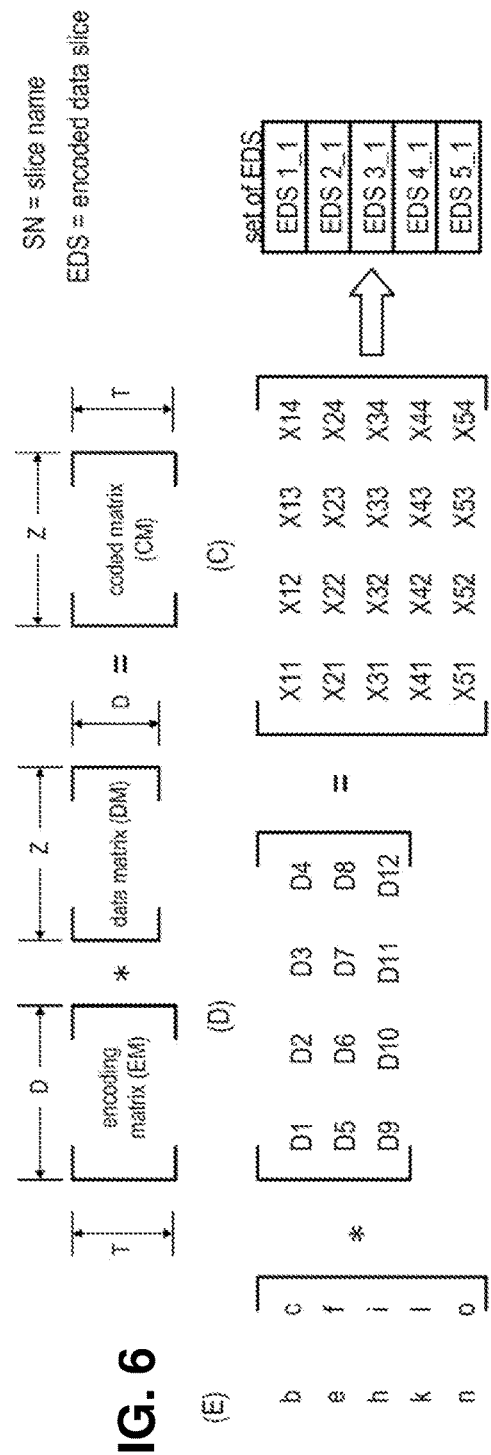
FIG. 6
FIG. 7
FIG. 8 ardından# USER-DEFINED CUSTOM STORAGE CLASSES FOR HYBRID-CLOUD AND MULTICLOUD DATA MANAGEMENT

BACKGROUND

Aspects of the present invention relate generally to managing operations in dispersed storage networks and, more particularly, to systems and methods for providing user-defined custom storage classes for hybrid-cloud and multi-cloud data management.

Computing devices communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

A computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop® is an open source software framework that supports distributed applications enabling application execution by thousands of computers.

In addition to cloud computing, a computer may use "cloud storage" as part of its memory system. Cloud storage enables a user, via its computer, to store files, applications, etc., on an Internet storage system. The Internet storage system may include a RAID (redundant array of independent disks) system and/or a dispersed storage system that uses an error correction scheme to encode data for storage.

SUMMARY

In a first aspect of the invention, there is a computer-implemented method including: receiving, by a computing device, input defining a custom storage class in a first dispersed storage network; receiving, by the computing device, input defining a data management rule in the first dispersed storage network; determining, by the computing device, a data object in the first dispersed storage network satisfies the data management rule; and moving, by the computing device and in response to the determining, the data object to a second dispersed storage network according to the custom storage class.

In another aspect of the invention, there is a computer program product comprising one or more computer readable storage media having program instructions collectively stored on the one or more computer readable storage media, the program instructions executable to: receive input defining a custom storage class in the first dispersed storage network; receive input defining a data management rule in the first dispersed storage network; determine a data object in the first dispersed storage network satisfies the data management rule; and move, in response to the determining, the data object to a second dispersed storage network according to the custom storage class.

In another aspect of the invention, there is a system comprising at least one dispersed storage processing unit in a first dispersed storage network, each of the at least one dispersed storage processing unit comprising a processor, one or more computer readable storage media, and program instructions collectively stored on the one or more computer readable storage media for execution by the processor. Execution of the program instructions cause the at least one dispersed storage processing unit to: receive input defining a custom storage class in the first dispersed storage network; receive input defining a data management rule in the first dispersed storage network; determine a data object in the first dispersed storage network satisfies the data management rule; and move, in response to the determining, the data object to a second dispersed storage network according to the custom storage class.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 5 is a schematic block diagram of an example of dispersed storage error encoding of data in accordance with aspects of the present invention.

FIG. 6 is a schematic block diagram of a generic example of an error encoding function in accordance with aspects of the present invention.

FIG. 7 is a schematic block diagram of a specific example of an error encoding function in accordance with aspects of the present invention.

FIG. 8 is a schematic block diagram of an example of a slice name of an encoded data slice (EDS) in accordance with aspects of the present invention.

DETAILED DESCRIPTION

Figure 1:
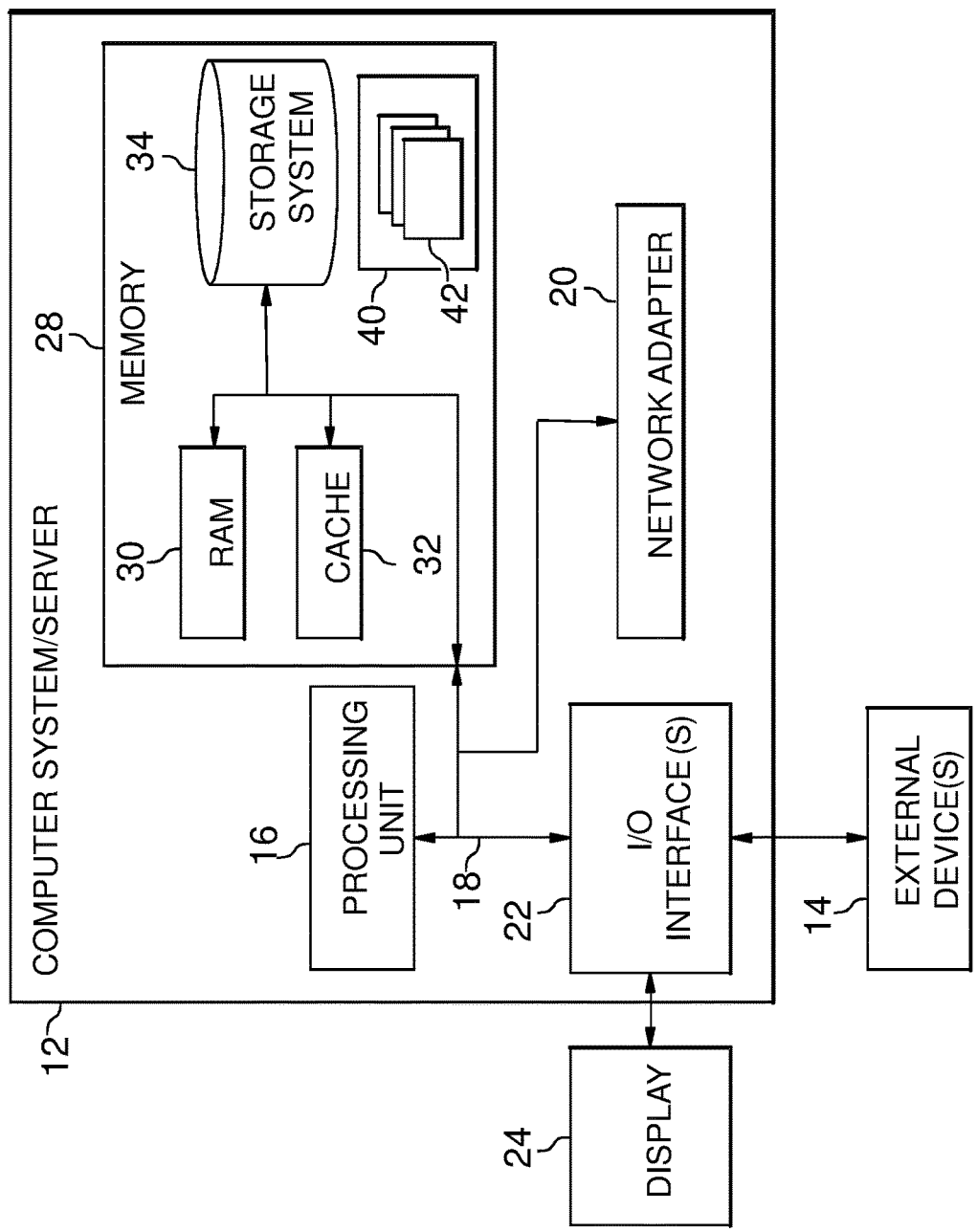
FIG. 1 depicts a cloud computing node according to an embodiment of the present invention.

Aspects of the present invention relate generally to managing operations in dispersed storage networks and, more particularly, to systems and methods for providing user-defined custom storage classes for hybrid-cloud and multi-cloud data management. Embodiments of the invention permit a user to define a custom storage class and a data management rule that utilizes the custom storage class, and the system automatically moves the user's data to the custom storage class in response to determining satisfaction of the data management rule.

A dispersed storage network (DSN) typically offers various storage classes (also called tiers) that are designed for different availability, reliability, and performance characteristics. Different storage classes are typically predefined by the DSN system operator, and the different predefined storage classes are typically associated with different storage media (e.g., solid state memory, hard drive, tape, etc.) that provide different availability, reliability and performance characteristics of data storage. A user of a DSN is usually limited to selecting from the predefined storage classes when storing their data in a DSN and/or when creating a policy to manage the lifecycle of the objects across these storage classes. Such a policy essentially limits the movement of data within the DSN memory system.

For example, a DSN user might manage the lifecycle of the data objects they are storing in the DSN across the various storage classes to ensure that data objects are kept in the correct tier to ensure desired performance levels for different data objects and to reduce costs. In an on-premises system, the DSN user is ultimately limited by hardware that is deployed in the on-premises system. In order to provide infinite scale to an on-premises system, it would be advantageous to have the capability to create a tier that can be in a public cloud. In a public cloud system, the DSN user may have access to infinite capacity but may have other limitations like cost, availability, application ecosystem, etc. These too make it advantageous to have the capability to create a tier that can be in another public cloud.

Aspects of the invention address the limitations of predefined (e.g., system defined) storage classes by providing a mechanism that allows a DSN user to create their own custom storage class (CSC) that points to a remote DSN memory. The DSN user can then use this CSC seamlessly in their data lifecycle management policies. This disclosure also describes a mechanism by which the DSN can manage the data movement to and from such a custom storage class.

According to aspects of the invention, a DSN user creates a custom storage class by specifying: a unique name for their storage class; a remote storage endpoint of a remote memory (e.g., to which the user data will be moved); a storage provider or protocol (of the remote memory) used to transfer the data to the remote storage endpoint; credentials for accessing the remote storage endpoint; a logical abstraction (e.g., a bucket) in the remote memory where the data will be stored; and any specific remote storage class that can be used when storing data in the remote logical abstraction.

By defining a custom storage class in this manner, the user creates a custom tier in an alternate storage system, such as a public cloud. In embodiments, the DSN utilizes the user-defined unique name of the custom storage class in a data management policy associated with the user's data. In this way, implementations of the invention capture the details of the remote storage endpoint, the protocol, and the credentials necessary to move the user data, while the policy language that is used to specify the rules that trigger data movement remain the same. By specifying a custom storage class in the policy, the user is able to go beyond the scope of the local DSN and manage the data movement to an external DSN.

In accordance with aspects of the invention, the DSN detects such a custom storage class when evaluating a data management policy, such as an object lifecycle management (OLM) rule. In embodiments, the DSN detects the user-defined custom storage class based on the user-defined unique name that is different than the names of the pre-defined (e.g., system defined) storage classes that are available in the DSN. In embodiments, the DSN uses the protocol specified in the custom storage class definition to move data between a local tier and the remote storage based on the evaluation of the data management policy.

In implementations, the DSN provides an interface for an operator to specify the allowed storage provider or protocols that the system supports, and the custom storage class definition is then limited to these restricted set of storage providers or protocols. By using the mechanisms described here, a DSN user can extend their on-premises storage and obtain infinite capacity from a cloud tier. Similarly a cloud DSN user can move data between multiple clouds for higher availability, lower cost and leveraging specific applications. This creates seamless tiers across hybrid and multi cloud deployments that can be used for data management.

Aspects of the invention have the practical application of managing user data in a DSN in accordance with rules defined by the user. In particular, aspects of the invention permit a user to provide input to define a custom storage class and a data management rule that utilizes the user-defined custom storage class. In embodiments, the system automatically moves the user's data to the custom storage class in response to determining satisfaction of the data management rule. This automatic moving of user data to a user-defined custom storage class based on a user-defined data management rule constitutes an improvement in the technical field of data management in a DSN. Aspects of the invention are also rooted in computer technology including dispersed storage networks (DSNs) that utilize Information Dispersal Algorithms (IDAs).

As should be understood from the present disclosure, aspects of the invention provide a method for creating and using a user defined storage class for hybrid-cloud and multi-cloud data management in a dispersed storage unit (DSN) memory, the method comprising the steps of: defining a custom storage class by providing a unique name, a remote storage endpoint that data will be moved to, a storage provider or protocol used to transfer the data, a set of credentials for accessing the remote storage endpoint, a bucket in the remote DSN memory where the data will be stored, and any specific remote storage class that can be used when storing the data in the remote bucket; and detecting, at the DSN memory, the custom storage class when evaluating a lifecycle policy.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
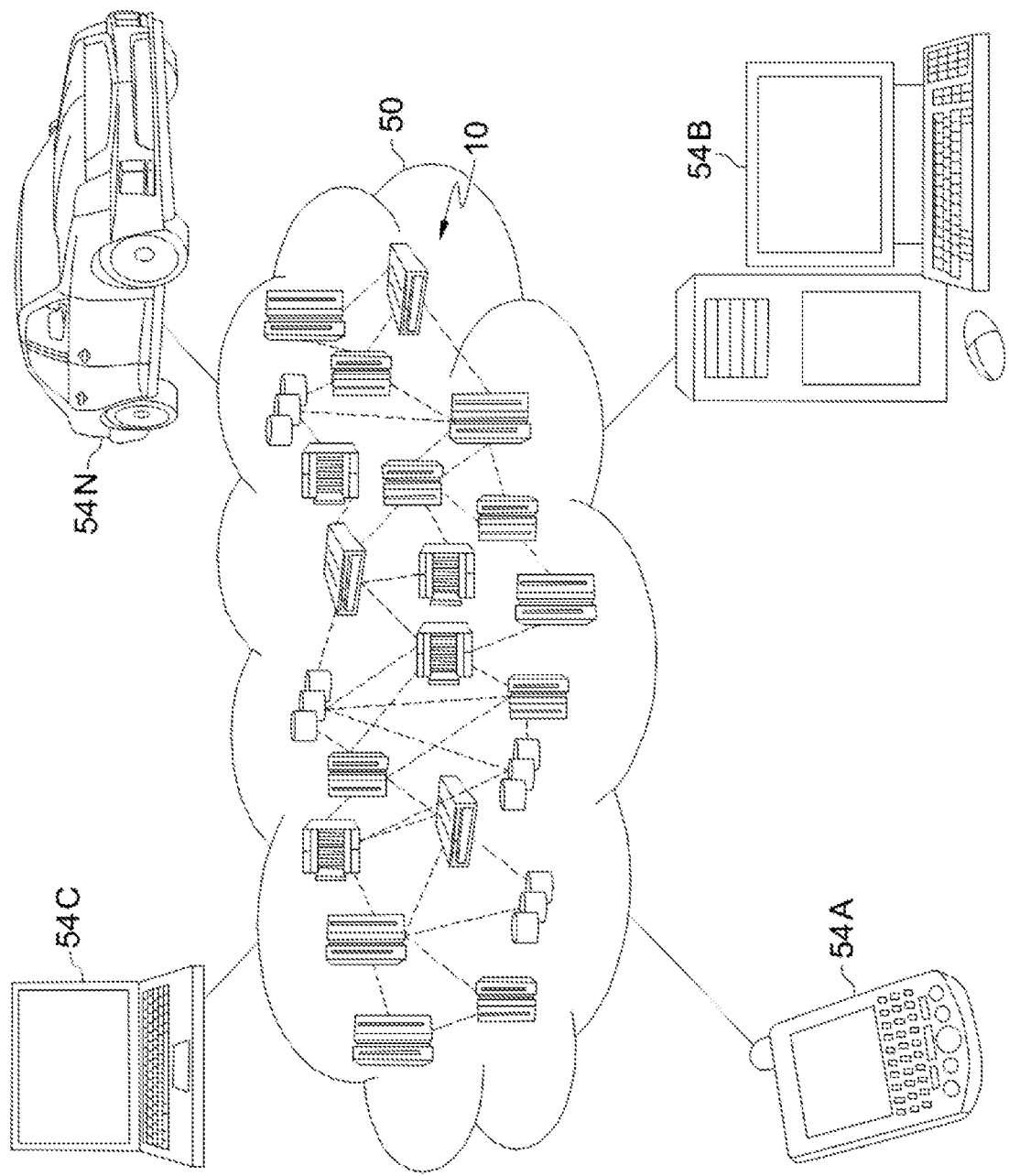
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
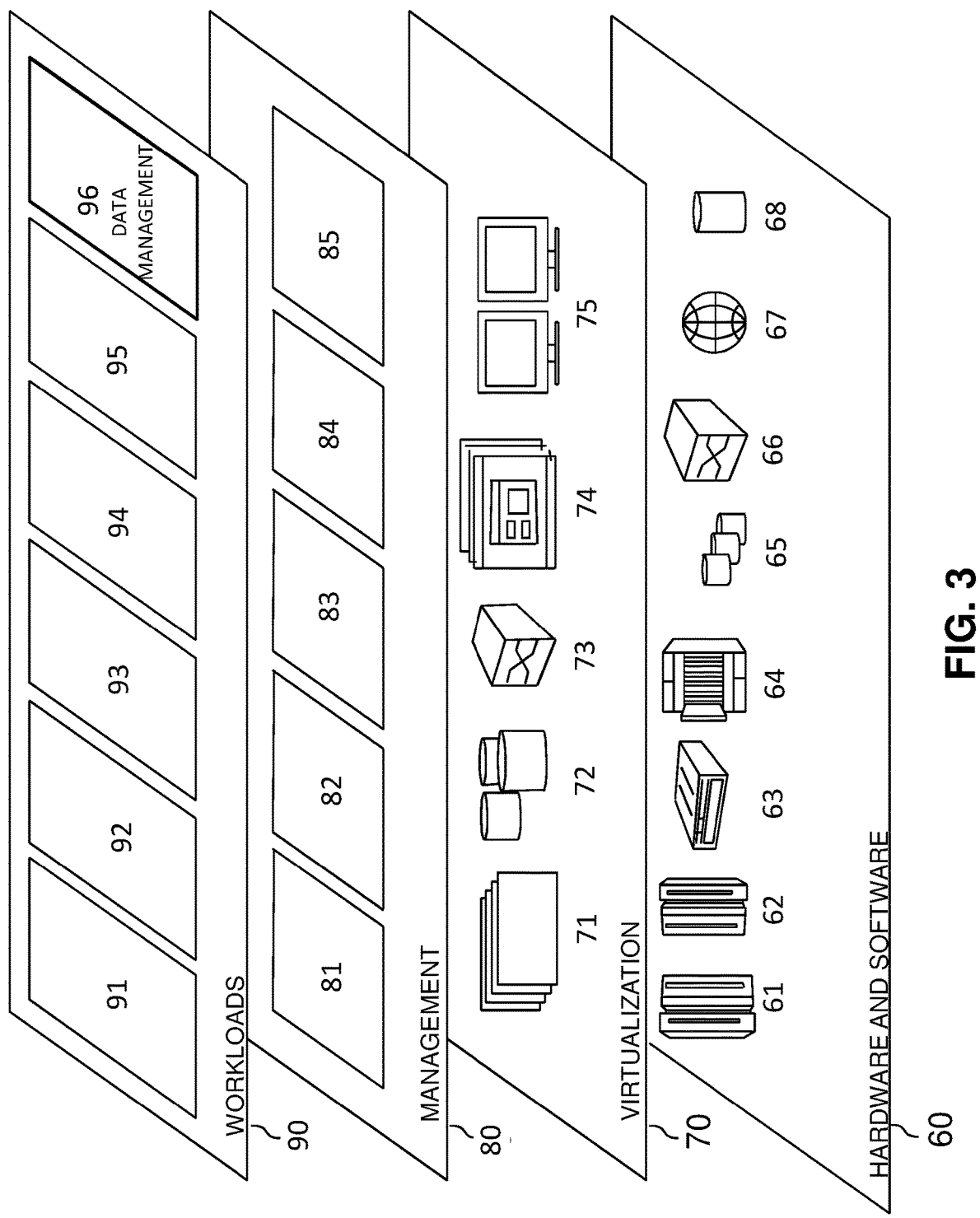
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data management 96.

Implementations of the invention may include a computer system/server 12 of FIG. 1 in which one or more of the program modules 42 are configured to perform (or cause the computer system/server 12 to perform) one of more functions of the data management 96 of FIG. 3. For example, the one or more of the program modules 42 may be configured to: receive input defining a custom storage class in the first dispersed storage network; receive input defining a data management rule in the first dispersed storage network; determine a data object in the first dispersed storage network satisfies the data management rule; and move, in response to the determining, the data object to a second dispersed storage network according to the custom storage class.

Figure 4:
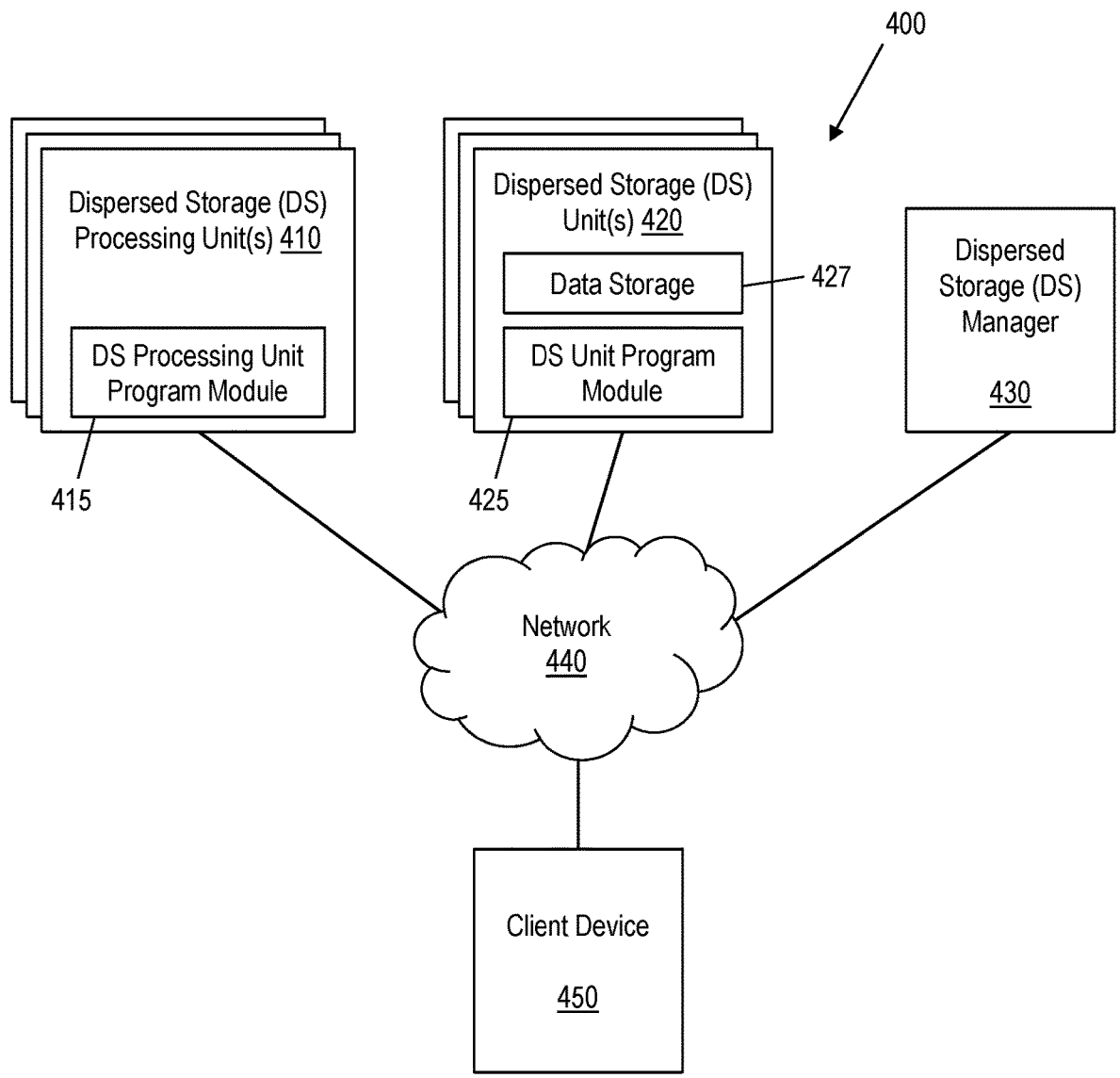
FIG. 4 shows a dispersed storage network (DSN) in accordance with aspects of the invention.

FIG. 4 shows a dispersed storage network 400 (referred to as a DSN, DSN memory, or dsNet) in accordance with aspects of the invention. In embodiments, the DSN 400 comprises plural dispersed storage processing units 410 (DS processing units), plural dispersed storage units 420 (DS units), and at least one dispersed storage manager 430 (DS manager). The DS processing units 410, the DS units 420, and the DS manager 430 all communicate via a network 440, which comprises one or more computer networks such as a LAN, WAN, and the Internet. In a cloud implementation, the network 440 is a cloud computing environment 50 of FIG.

2, and each of the DS processing units 410, the DS units 420, and the DS manager 430 are nodes 10 in the cloud computing environment 50.

In accordance with aspects of the invention, the DSN 400 stores data using object storage technology, which uses Information Dispersal Algorithms (IDAs) to separate a data object into slices that are distributed to plural ones of the DS units 420. As used herein, a slice is a dispersed piece of encoded data. Slices are created from an original data object and can be used to recreate the original data object. In particular, the DSN 400 creates slices using a combination of erasure coding, encryption, and dispersal algorithms. The erasure coding generates 'extra' slices for each data object, such that the data object can be recreated from a subset (less than all of) the total number of slices that are stored for this data object. By dividing a data object into slices and storing the slices at plural different DS units 420, the DSN 400 ensures that no single one of the DS units 420 has all the slices that are necessary to recreate the data object. Moreover, by creating extra slices for each data object, the DSN 400 can tolerate multiple failures without losing the ability to recreate the original data object, e.g., from the available slices.

According to aspects of the invention, the DS manager 430 provides a management interface that is used for system administrative tasks, such as system configuration, storage provisioning, and monitoring the health and performance of the system. The DS manager 430 may comprise a physical device (e.g., a computer device such as computer system/server 12 of FIG. 1), a virtual machine (VM), or a container (e.g., a Docker container). The term "Docker" may be subject to trademark rights in various jurisdictions throughout the world and is used here only in reference to the products or services properly denominated by the mark to the extent that such trademark rights may exist.

According to aspects of the invention, the DS processing units 410 are configured to encrypt and encode data during a write operation, to manage the dispersal of slices of data during a write operation, and to decode and decrypt data during a read operation. In one example, during a write operation, one or more of the DS processing units 410 are configured to generate data slices for storage by performing a dispersed storage error encoding function on a set of data segments for storage, where the encoded data slices of a data segment are transmitted to an information dispersal algorithm (IDA) width threshold number of DS units 420, e.g., as described in more detail at FIGS. 5-8. In this example, during a read operation, one or more of the DS processing units 410 are configured to recover a data segment by retrieving at least an IDA decode threshold number of encoded data slices from at least a corresponding IDA decode threshold number of DS units 420, and by performing a dispersed storage error decoding function on the received encoded data slices, e.g., as described in more detail at FIGS. 9-10.

In embodiments, the DS processing units 410 are stateless components that present a storage interface to a client application and that transform data objects into slices using an IDA. Each DS processing unit 410 may comprise a physical device (e.g., a computer device such as a computer system/server 12 of FIG. 1), a virtual machine (VM), or a container (e.g., a Docker container).

In embodiments, each DS processing unit 410 comprises a DS processing unit program module 415 that is configured to perform processes of the DS processing unit 410 as described herein, e.g., encrypt and encode data during a write operation, manage the dispersal of slices of data during a write operation, and decode and decrypt data during a read operation, etc. The DS processing unit program module 415 may comprise one or more program modules 42 as described with respect to FIG. 1.

According to aspects of the invention, the DS units 420 are configured to store the data slices that are received from a DS processing unit 410 during a write, and to return data slices to a DS processing unit 410 during a read. Each DS unit 420 may comprise a physical device (e.g., a computer device such as a computer system/server 12 of FIG. 1), a virtual machine (VM), or a container (e.g., a Docker container).

In embodiments, each DS unit 420 comprises DS unit program module 425 and data storage 427. The DS unit program module 425 may comprise one or more program modules 42 as described with respect to FIG. 1, and is configured to perform processes of the DS unit 420 as described herein, e.g., store data slices that are received from a DS processing unit 410 during a write, return data slices to a DS processing unit 410 during a read, perform compaction of data in the data storage 427, etc.

In embodiments, the data storage 427 receives and stores data in accordance with instructions received from the DS unit program module 425. The data storage 427 is one or more of any type or combination of types of data storage medium, data storage device, or system (e.g., storage device 65 of FIG. 3) and is located on (or is accessible to) the DS unit 420. For example, the data storage 427 may include one or more hard drives, SMR (Shingled Magnetic Recording) drives, solid state drives (SSDs), Tape Drives, and other memory devices.

In implementations, a client device 450 runs a client application that communicates with one of the DS processing units 410 to perform data operations in the DSN 400. In embodiments, the client application uses application programming interfaces (APIs) to perform data operations in the DSN 400. In one example, a first API call (e.g., PUT) writes a data object to the DSN 400, a second API call (e.g., GET) reads a data object from the DSN 400, a third API call (e.g., DELETE) deletes a data object from the DSN 400, and a fourth API call (e.g., LIST) lists all the data objects in a bucket in the DSN 400. In embodiments, the client device 450 comprises a computer device such as a laptop computer, desktop computer, tablet computer, etc., and may comprise one or more components of the computer system/server 12 of FIG. 1. In embodiments, the client application running on the client device 450 is a software application, and may comprise one or more program modules 42 as described with respect to FIG. 1. In embodiments, the client device 450 communicates with one of the DS processing units 410 via the network 440.

FIGS. 5-10 illustrate an exemplary operation of the DSN 400. FIG. 5 is a schematic block diagram of an example of dispersed storage error encoding of data. When a DS processing unit 410 has data to store it disperse storage error encodes the data in accordance with a dispersed storage error encoding process based on dispersed storage error encoding parameters. Here, the computing device stores a data object, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 6 and a specific example is shown in FIG. 7); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the DS processing unit 410 divides data object into a plurality of fixed sized data segments (e.g., 1 through Y of a fixed size in range of kilobytes to terabytes or more). The number of data segments created is dependent of the size of the data and the data segmenting protocol.

The DS processing unit 410 then disperse storage error encodes a data segment using the selected encoding function (e.g., Cauchy Reed-Solomon) to produce a set of encoded data slices. FIG. 6 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 7 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 5, the computing device also creates a slice name (SN) for each encoded data slice (EDS) in the set of encoded data slices. A typical format for a slice name 480 is shown in FIG. 8. As shown, the slice name (SN) 480 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory.

As a result of encoding, the DS processing unit 410 produces a plurality of sets of encoded data slices, which are provided with their respective slice names to the storage units (DS unit 420 numbers one through five in this example) for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 9:
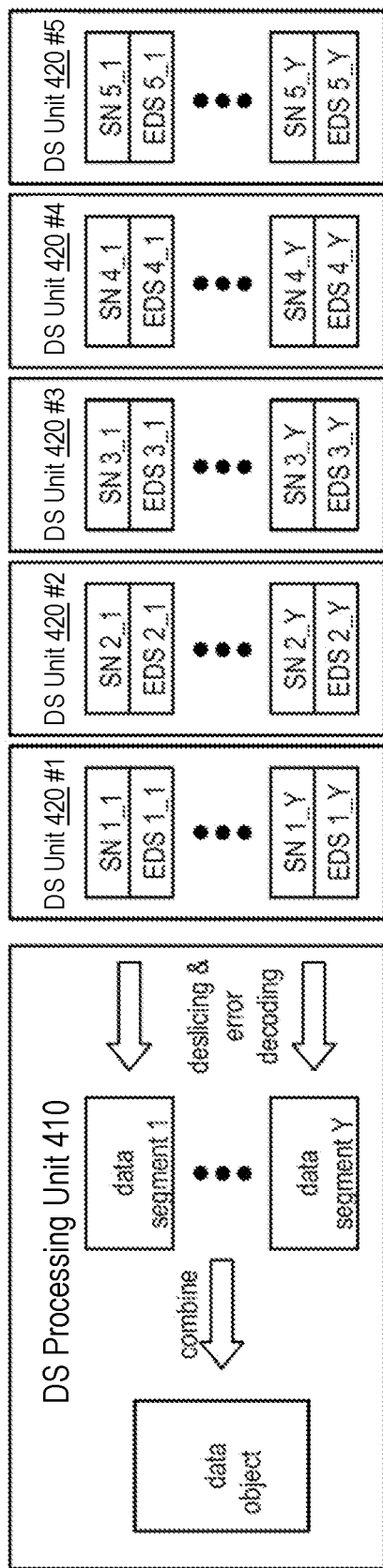
FIG. 9 is a schematic block diagram of an example of dispersed storage error decoding of data in accordance with aspects of the present invention.

FIG. 9 is a schematic block diagram of an example of dispersed storage error decoding of a data object that was dispersed storage error encoded and stored in the example of FIG. 6. In this example, the DS processing unit 410 retrieves from the storage units at least the decode threshold number of encoded data slices per data segment. As a specific example, the computing device retrieves a read threshold number of encoded data slices.

Figure 10:
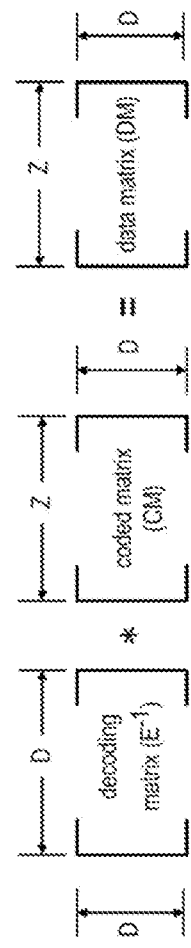
FIG. 10 is a schematic block diagram of a generic example of an error decoding function in accordance with aspects of the present invention.

To recover a data segment from a decode threshold number of encoded data slices, the computing device uses a decoding function as shown in FIG. 10. As shown, the decoding function is essentially an inverse of the encoding function of FIG. 6. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 11:
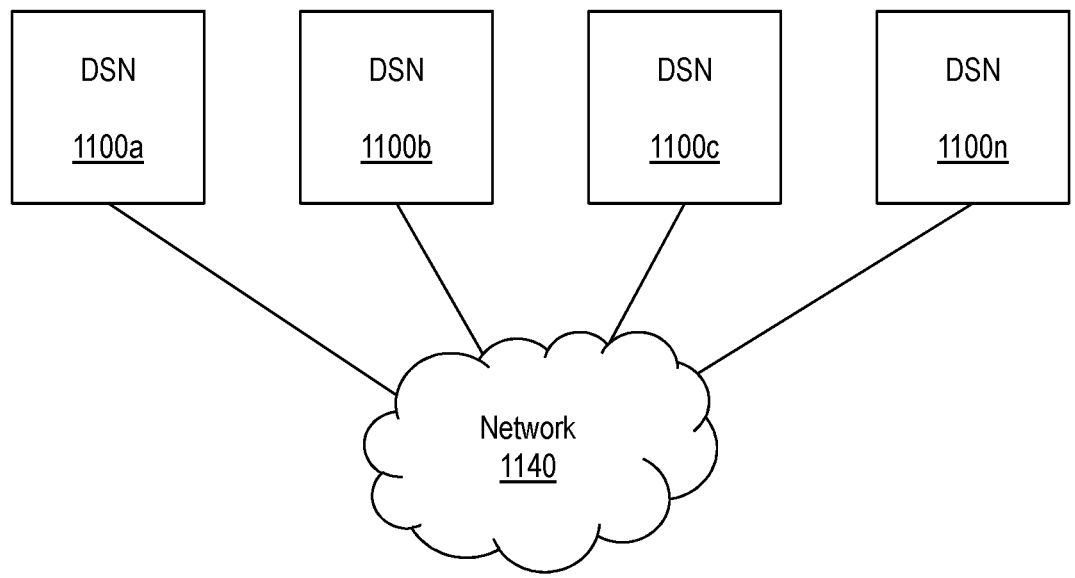
FIG. 11 shows a block diagram of an exemplary environment in accordance with aspects of the invention.

FIG. 11 shows a block diagram of an exemplary environment in accordance with aspects of the invention. As shown in FIG. 11, plural DSNs 1100a, 1100b, 1100c, . . . , 1100n are connected via a network 1140, which may include a WAN or the Internet. In embodiments, each respective one of the DSNs 1100a-n corresponds to an individual and separate instance of a DSN 400 as shown in FIG. 4. In this manner, each respective one of the DSNs 1100a-n is separate and distinct from the other ones of the DSNs 1100a-n. For example, DSN 1100a may be an on-premises (e.g., private) DSN that is owned and operated by an organization (e.g., an enterprise), DSN 1100b may be a public cloud DSN owned and operated by a service provider, DSN 1100c may be another public cloud DSN owned and operated by another service provider, and DSN 1100n may be yet another public cloud DSN owned and operated by yet another service provider. As used herein, a private DSN is operated solely for an organization (it may be managed by the organization or a third party and may exist on-premises or off-premises), and is different from a public cloud DSN that is made available to the general public or a large industry group and is owned by an organization selling cloud services.

In embodiments, each one of the DSNs 1100a-n has a set of predefined storage classes that respective users of the DSN can utilize to store their data. The respective sets of predefined storage classes are typically different for each respective one of the DSNs 1100a-n, and may be defined by each DSN based on different storage media (e.g., solid state memory, hard drive, tape, etc.) that provide different availability, reliability and performance characteristics of data storage. In the case of a public cloud DSN, each different storage class in the set of predefined storage classes may have a different cost (e.g., price) to the user of the public cloud DSN. For example, public cloud DSNs typically charge users relatively more to store data in a first storage class that utilizes a faster storage media (e.g., solid state drive) and charge users relatively less to store data in a second storage class that utilizes a slower storage media (e.g., tape).

In embodiments, each one of the DSNs 1100*a-n* has a mechanism by which a user of the respective DSN can define data management rules for their data stored in the particular DSN. An example of a data management rule is an object lifecycle management (OLM) rule by which the DSN manages the lifecycle of the user data. For example, the user may want to configure the DSN to remove data that has reached a certain age, or to remove data after a certain date. As another example, rather than remove data, the user may wish to move the data to a lower cost, or lower performance, storage media. According to aspects of the invention, each one of the DSNs 1100*a-n* may be organized into multiple logical storage units (e.g., buckets), each of which may have different object lifecycle management rules. In embodiments, a user may define one or more object lifecycle management rules for a bucket containing the user's data.

As used herein, a bucket is a logical storage unit defined by a DSN. A respective one of the DSNs 1100*a-n* may define plural different buckets for plural different users of the respective DSN. A user of a DSN (e.g., DSN 1100*a*) may have plural buckets in the one DSN. Additionally, a user may have one or more buckets in different ones of the DSNs 1100*a-n*, e.g., one or more buckets in DSN 1100*a* and one or more buckets in DSN 1100*b*. In embodiments, a user puts a data object in, and retrieves a data object from, one of their buckets using various API calls, e.g., as described with respect to FIG. 4. In this manner, a bucket is a logical storage unit (sometimes called a container) in which a user stores their data in a DSN.

According to aspects of the invention, each bucket may have one or more data management rules, such as OLM rules, that define certain actions to perform on data objects in the bucket when certain conditions are satisfied. In embodiments, each one of the DSNs 1100*a-n* has a front-end comprising an API that the client application running on the client device 450 calls to define data management rules for a bucket. As used herein, a data management rule that is associated with a bucket is a data structure that defines a prescribed action for the DSN to perform on a data object in the bucket when metadata associated with the data object satisfies a condition defined in the rule. Conditions defined in a data management rule may include but are not limited to one or more of: matching prefixes; matching suffixes; the data object being older than a predefined age; a calendar date having been reached; the data object was created during a specific date range; the amount of space utilized has reached or exceeded a threshold amount; and a current storage class of the data object. Actions defined in a data management rule may include but are not limited to one or more of: deleting an object from the DSN; moving an object to a different storage medium within the DSN; and moving a data object to a different storage system (e.g., from DSN 1100*a* to DSN 1100*b*). For example, a data management rule associated with a particular bucket might specify that any data object (in the bucket) that is older than 6 months is deleted. As another example, a data management rule may specify that all data objects (in the bucket) that begin with the prefix "/merger" are moved to a different tier of storage after a date defined by the rule. These examples are not limiting, and different rules may be used.

According to aspects of the invention, a DSN (e.g., one of DSNs 1100*a-n*) permits a user to define a custom storage class that differs from the predefined (system defined) storage classes of the DSN. In embodiments, the user defines their custom storage class by inputting custom storage class definition data via a user interface (UI) or API call at the client device 450. In an exemplary embodiment, the custom storage class definition data includes: a unique name; a remote storage endpoint that data will be moved to; a storage provider or protocol used to transfer the data; a set of credentials for accessing the remote storage endpoint; a bucket in the remote DSN memory where the data will be stored; and any specific remote storage class that can be used when storing the data in the remote bucket.

In embodiments, the unique name defined in the custom storage class definition data is a string of characters (e.g., alpha, numeric, symbolic, etc.) that that is usable in API calls of the DSN. In a particular embodiment, the custom storage class unique name differs from the name of each of the predefined storage classes in the DSN. For example, DSN 1100*a* might have predefined storage classes with the names "Frequent Access", "Occasional Access", and "Infrequent Access", and the unique name of the custom storage class is any unique string of characters that differs from these three names of the predefined storage classes, e.g., "User Custom Storage Class". In this manner, the custom storage class defines a name for referring to the custom storage class, e.g., when defining data management rules.

In embodiments, the remote storage endpoint defined in the custom storage class definition data is a Uniform Resource Locator (URL) or other similar data that defines an endpoint in a remote DSN. In the example in which a user of DSN 1100*a* is defining a custom storage class in DSN 1100*a*, the remote storage endpoint defined in the custom storage class definition data is a URL of a storage location in on of DSN 1100*b*, DSN 1100*c*, or DSN 1100*n*. In this manner, the custom storage class defines an endpoint in the remote DSN for storing the data.

In embodiments, the storage provider or protocol defined in the custom storage class definition data is an indicator of the service provider that owns the DSN that contains the remote endpoint and/or an indicator of the protocol used in the DSN that contains the remote endpoint. Consider the example of the user of DSN 1100*a* defining a custom storage class in DSN 1100*a*, and the remote endpoint being a URL of a storage location in on of DSN 1100*b*. In this example, the storage provider or protocol defined in the custom storage class definition data is an indicator of the service provider that owns DSN 1100*b* and/or an indicator of the protocol used in DSN 1100*b*. In this manner, the custom storage class defines a protocol for transferring data to the remote DSN.

In embodiments, the credential defined in the custom storage class definition data is a credential for accessing the remote storage endpoint defined in the same custom storage class. Consider the example of the user of DSN 1100*a* defining a custom storage class in DSN 1100*a*, and the remote endpoint being a URL of a storage location in on of DSN 1100*b*. In this example, the credential defined in the custom storage class definition data is a credential that is associated with an account in DSN 1100*b* that is usable to access DSN 1100*b*. The credential may be any conventional or later developed type of credential, including but not limited to: username and password, API key, etc. In this manner, the custom storage class includes a credential for accessing the remote DSN.

In embodiments, the bucket defined in the custom storage class definition data is a bucket in the remote DSN (i.e., in the DSN that contains the remote storage endpoint defined in the same custom storage class). Consider the example of the user of DSN 1100*a* defining a custom storage class in DSN 1100*a*, and the remote endpoint being a URL of a storage location in on of DSN 1100*b*. In this example, the bucket defined in the custom storage class definition data is a name of a bucket associated with the URL of the storage location in on of DSN 1100*b*. As previously described, a bucket is a logical storage unit (sometimes called a container) in which a user stores their data in a DSN, a single user may have different accounts with plural different DSNs, and that single user may have one or more buckets in each of the plural different DSNs. In this manner, the custom storage class defines a bucket in the remote DSN for storing the data.

In embodiments, the specific remote storage class defined in the custom storage class definition data is a name of a storage class in the remote DSN (i.e., in the DSN that contains the remote storage endpoint defined in the same custom storage class). Consider the example of the user of DSN 1100*a* defining a custom storage class in DSN 1100*a*, and the remote endpoint being a URL of a storage location in on of DSN 1100*b*. In this example, the specific remote storage class defined in the custom storage class definition data is a predefined (system defined) storage class of DSN 1100*b*. In this manner, the custom storage class defines a storage class in the remote DSN for storing the data.

Continuing the illustrative example of the user of DSN 1100*a* defining a custom storage class in DSN 1100*a*, the custom storage class definition data may include the information shown in Table 1.

TABLE 1

| CSC Name | MyCustomClass |
| --- | --- |
| CSC remote storage endpoint | https://example.remote.endpoint.B.com/ |
| CSC service provider/protocol | ServiceProviderB |
| CSC credential | usernameB, passwordB |
| CSC bucket | TargetBucket |
| CSC remote storage class | Tier2 |

In the example shown in Table 1, the user of DSN 1100*a* defines a custom storage class with the name "MyCustomClass". This user defined custom storage class has a remote storage endpoint defined by the URL https://example.remote.endpoint.B.com/which, in this example, is a URL in DSN 1100*b*, with which this user also has an account for storing data. This user defined custom storage class identifies the service provider of the remote storage endpoint as ServiceProviderB. This user defined custom storage class includes the user's credentials for accessing their account in DSN 1100*b*, i.e., usernameB, password. This user defined storage class also defines a bucket (i.e., TargetBucket) in DSN 1100*b*, which in this example is a name of a bucket associated with this user's account in DSN 1100*b*. This user defined storage class also defines a storage class (i.e., Tier2) in DSN 1100*b*, which in this example is one of plural predefined storage classes in DSN 1100*b* (e.g., Tier1, Tier2, Tier3, Tier4), each of which has different performance and/or cost as is understood with predefined storage classes.

In embodiments, a user defines a data management rule that refers to the user's custom storage class. For example, the user may define a data management rule that includes the unique name of the user's custom storage class as specified in the custom storage class definition data. Continuing the example shown in Table 1, the user of DSN 1100*a* defines a data management rule for one of their buckets in DSN 1100*a*, and this data management rule includes at least one condition and the name "MyCustomClass". In this example, when the DSN 1100*a* determines the at least one condition is satisfied for a data object in the bucket in DSN 1100*a*, the DSN 1100*a* automatically moves this data object from the bucket of DSN 1100*a* to the remote storage endpoint defined in the custom storage class (i.e., https://example.remote.endpoint.B.com/). In this example, the DSN 1100*a* uses the credential (i.e., usernameB, passwordB) to access the DSN 1100*b* and puts the data object in the bucket defined in the custom storage class (i.e., TargetBucket) using the remote storage class of DSN 1100*b* defined in the custom storage class (i.e., Tier2). In this manner, the user of DSN 1100*a* defines a custom storage class in DSN 1100*a* and defines a data management rule for data objects in a bucket of DSN 1100*a*. Subsequently, when the DSN 1100*a* determines that the data management rule is satisfied for a data object in the bucket in DSN 1100*a*, the DSN 1100*a* then moves this data object to the remote storage defined in the custom storage class, which in this example is a bucket in a different DSN (e.g., DSN 1100*b*).

Figure 12:
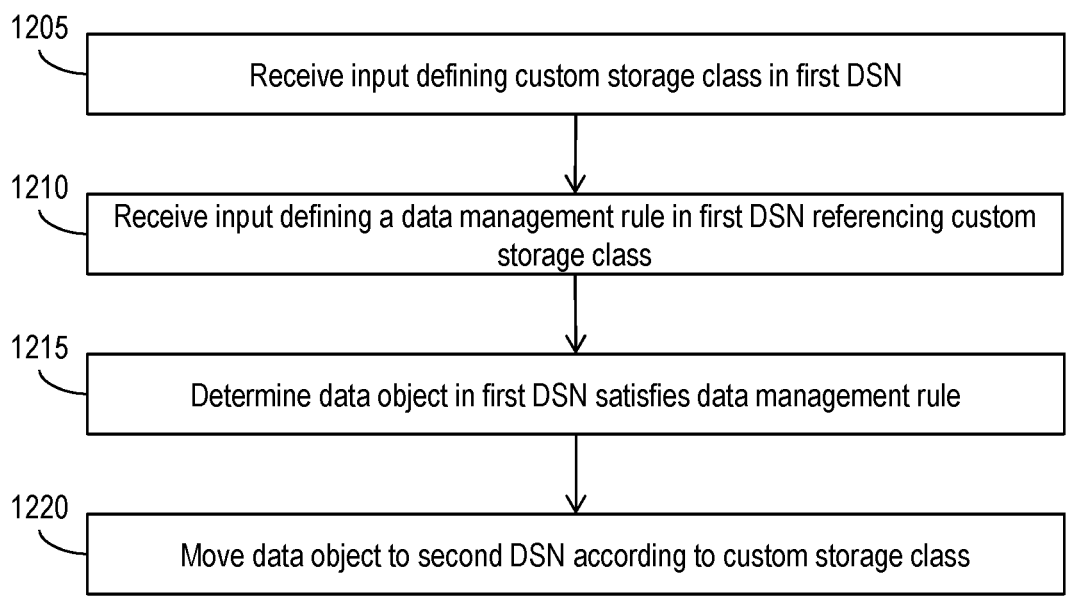
FIG. 12 shows a flowchart of an exemplary method in accordance with aspects of the invention.

FIG. 12 depicts a flowchart of an exemplary method in accordance with aspects of the invention. In embodiments, the steps of the method are performed in the environments of FIGS. 4 and 11 and are described with reference to the elements shown in FIGS. 4 and 11.

At step 1205, the system receives input defining a custom storage class in a first DSN. In embodiments, and as described with respect to FIGS. 4 and 11, a DS processing unit 410 of DSN 1100*a* receives user input from client device 450, where the user input defines a custom storage class in DSN 1100*a*. The user input may be provided via user interface at the client device 450 or API call made from the client device 450. In embodiments, and as described with respect to FIG. 11, the user input includes custom storage class definition data, such as that shown in Table 1, for example.

At step 1210, the system receives input defining a data management rule in the first DSN, the data management rule referencing the custom storage class defined at step 1205. In embodiments, and as described with respect to FIGS. 4 and 11, a DS processing unit 410 of DSN 1100*a* receives user input from client device 450, where the user input defines a data management rule comprising at least one condition and the name of the custom storage class that was defined at step 1205.

In implementations, step 1210 also includes user input indicating a bucket in DSN 1100*a* to which the data management rule applies. In a non-limiting illustrative example, the data management rule at step 1210 may indicate that for the bucket named "BucketA" in DSN 1100*a*, any data object (in this bucket) that has the prefix "reports/" and that is more than three months old shall be moved to "MyCustomClass" (i.e., the name of the custom storage class defined at step 1205).

In implementations, the DSN 1100*a* receives at least one data object to be stored in the bucket indicated at step 1210, and the DSN 1100*a* stores the data object in the bucket. For example, before, concurrently with, or after step 1210, the DS processing unit 410 receives an instruction from the client device 450 to write a data object to the bucket. In response to this instruction, the DS processing unit 410 stores the data object in the bucket by generating data slices of the data object and transmitting the data slices to a number of DS units 420, e.g., as described in at FIGS. 5-8.

At step 1215, the system determines that a data object in the first DSN satisfies the data management rule that was defined at step 1210. In embodiments, and as described with respect to FIGS. 4 and 11, a DS processing unit 410 of DSN 1100*a* periodically assesses each data object in the bucket to determine whether the data object satisfies the data management rule associated with the bucket. This may include, for example, comparing metadata of the data object to one or more conditions defined in the data management rule. When the data object satisfies the data management rule, the DS processing unit 410 performs an action on the data object as prescribed by the data management rule. In embodiments, the action is moving the data object from its current storage location (e.g., BucketA in DSN 1100*a*) to the storage location defined by the custom storage class that is referenced in the data management rule, as described at step 1220

At step 1220, the system moves the data object (from step 1215) to a second DSN according to the custom storage class defined at step 1205. In embodiments, and as described with respect to FIGS. 4 and 11, a DS processing unit 410 of DSN 1100*a* moves the data object that was determined to satisfy the data management rule to a remote location defined by the custom storage class that is referenced in the data management rule. Using the example described with respect to FIG. 11, step 1220 comprises the DSN 1100*a* automatically moving this data object from the bucket of DSN 1100*a* to the remote storage endpoint defined in the custom storage class (i.e., https://example.remote.endpoint.B.com/), using the credential (i.e., usernameB, passwordB), the bucket (i.e., TargetBucket), and the remote storage class of DSN 1100*b* (i.e., Tier2) defined in the custom storage class. In embodiments, step 1220 includes the DS processing unit 410 of DSN 1100*a* reading the data object, e.g., as described with respect to FIGS. 4 and 9-10, and then transmitting the data object to DSN 1100*b* for storage in accordance with the storage protocol(s) used by DSN 1100*b*.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computing device, input defining a custom storage class in a first dispersed storage network in a first cloud of a multi cloud storage deployment;
receiving, by the computing device, input defining a data management rule in the first dispersed storage network;
determining, by the computing device, a data object in the first dispersed storage network satisfies the data management rule; and
moving, by the computing device and in response to the determining, the data object to a second dispersed storage network in a second cloud of the multi cloud storage deployment according to the custom storage class,
wherein the input defining the custom storage class includes:
a custom storage class name; and
a custom storage class remote storage endpoint comprising a Uniform Resource Locator (URL) that defines an endpoint in the second dispersed storage network in the second cloud of the multi cloud storage deployment.

2. The method of claim 1, wherein the input defining the custom storage class further includes:
a custom storage class protocol comprising an indicator of a protocol used in the second dispersed storage network in the second cloud of the multi cloud storage deployment;
a custom storage class credential that provides access to the endpoint defined in the custom storage class remote storage endpoint;
a custom storage class bucket; and
a custom storage class remote storage class.

3. The method of claim 2, wherein the data management rule includes at least one condition and the custom storage class name.

4. The method of claim 3, wherein the data management rule is defined for a bucket in the first dispersed storage network, and further comprising storing the data object in the bucket in the first dispersed storage network.

5. The method of claim 1, wherein the determining and the moving are performed by a dispersed storage processing unit in the first dispersed storage network.

6. The method of claim 1, wherein:
the first dispersed storage network in the first cloud of the multi cloud storage deployment is a private dispersed storage network; and
the second dispersed storage network in the second cloud of the multi cloud storage deployment is a public cloud dispersed storage network.

7. The method of claim 1, wherein:
the first dispersed storage network in the first cloud of the multi cloud storage deployment is a first public cloud dispersed storage network; and
the second dispersed storage network in the second cloud of the multi cloud storage deployment is a second public cloud dispersed storage network.

8. The method of claim 1, wherein:
the first dispersed storage network in the first cloud of the multi cloud storage deployment is a public cloud dispersed storage network; and the second dispersed storage network in the second cloud of the multi cloud storage deployment is a private dispersed storage network.

9. The method of claim 1, wherein the custom storage class has a different name than any predefined storage class in the first dispersed storage network.

10. The method of claim 1, wherein the determining the data object in the first dispersed storage network satisfies the data management rule comprises comparing metadata of the data object to one or more conditions of the data management rule.

11. A computer program product comprising one or more computer readable storage media having program instructions collectively stored on the one or more computer readable storage media, the program instructions executable to:
receive input defining a custom storage class in a first dispersed storage network in a first cloud of a multi cloud storage deployment;
receive input defining a data management rule in the first dispersed storage network;
determine a data object in the first dispersed storage network satisfies the data management rule; and
move, in response to the determining, the data object to a second dispersed storage network in a second cloud of the multi cloud storage deployment according to the custom storage class,
wherein the first dispersed storage network receives the input defining the custom storage class and the input defining a data management rule from a client device;
the first dispersed storage network includes plural predefined storage classes; and
the custom storage class comprises a user-defined storage class that is different than the plural predefined storage classes.

12. The computer program product of claim 11, wherein the input defining the custom storage class includes:
a custom storage class name that differs from a respective name of each of the plural predefined storage classes;
a custom storage class remote storage endpoint;
a custom storage class service provider and/or protocol;
a custom storage class credential;
a custom storage class bucket; and
a custom storage class remote storage class.

13. The computer program product of claim 12, wherein the data management rule is defined for a bucket in the first dispersed storage network, includes at least one condition, and includes the custom storage class name, and further comprising storing the data object in the bucket in the first dispersed storage network.

14. The computer program product of claim 11, wherein:
the first dispersed storage network in the first cloud of the multi cloud storage deployment is a first private dispersed storage network or a first public cloud dispersed storage network; and
the second dispersed storage network in the second cloud of the multi cloud storage deployment is a second private dispersed storage network or a second public cloud dispersed storage network.

15. The computer program product of claim 11, wherein the determining the data object in the first dispersed storage network satisfies the data management rule comprises comparing metadata of the data object to one or more conditions of the data management rule.

16. A system comprising at least one dispersed storage processing unit in a first dispersed storage network, each of the at least one dispersed storage processing unit comprising a processor, one or more computer readable storage media, and program instructions collectively stored on the one or more computer readable storage media for execution by the processor, wherein execution of the program instructions cause the at least one dispersed storage processing unit to:
receive input defining a custom storage class in the first dispersed storage network;
receive input defining a data management rule in the first dispersed storage network;
determine a data object in the first dispersed storage network satisfies the data management rule; and
move, in response to the determining, the data object to a second dispersed storage network according to the custom storage class,
wherein the input defining the custom storage class includes:
custom storage class name;
custom storage class remote storage endpoint;
custom storage class service provider and/or protocol;
custom storage class credential;
custom storage class bucket; and
custom storage class remote storage class.

17. The system of claim 16, wherein the data management rule is defined for a bucket in the first dispersed storage network, includes at least one condition, and includes the custom storage class name, and further comprising storing the data object in the bucket in the first dispersed storage network.

18. The system of claim 16, wherein:
the first dispersed storage network is a first private dispersed storage network or a first public cloud dispersed storage network; and
the second dispersed storage network is a second private dispersed storage network or a second public cloud dispersed storage network.

19. The system of claim 16, wherein the determining the data object in the first dispersed storage network satisfies the data management rule comprises comparing metadata of the data object to one or more conditions of the data management rule.

20. The system of claim 16, wherein the first dispersed storage network receives input defining the custom storage class name, the custom storage class remote storage endpoint, the custom storage class service provider and/or protocol, the custom storage class credential, the custom storage class bucket, and the custom storage class remote storage class from a client device.

* * * * *